(12) United States Patent
Roelfsema

(10) Patent No.: US 7,712,997 B2
(45) Date of Patent: May 11, 2010

(54) INFILTRATION BLOCK

(75) Inventor: Marcel Roelfsema, Stadskanaal (NL)

(73) Assignee: Wavin B.V. (NL)

( * ) Notice: Subject to any disclaimer, the term of this patent is extended or adjusted under 35 U.S.C. 154(b) by 608 days.

(21) Appl. No.: 11/629,922

(22) PCT Filed: Jun. 6, 2005

(86) PCT No.: PCT/EP2005/006118

§ 371 (c)(1),
(2), (4) Date: Dec. 18, 2006

(87) PCT Pub. No.: WO2005/124040

PCT Pub. Date: Dec. 29, 2005

(65) Prior Publication Data

US 2008/0044231 A1    Feb. 21, 2008

(30) Foreign Application Priority Data

Jun. 18, 2004   (EP)  .................................. 04076793
Mar. 11, 2005   (EP)  .................................. 05075605

(51) Int. Cl.
*E03F 1/00* (2006.01)
(52) U.S. Cl. ................ 405/45; 405/129.85; 210/170.07
(58) Field of Classification Search ....................... None
See application file for complete search history.

(56) References Cited

U.S. PATENT DOCUMENTS 5,810,510 A   9/1998   Urriola

FOREIGN PATENT DOCUMENTS

| AU | 620 283 B1 | 2/1992 |
| AU | 620283 | 2/1992 |
| EP | 943737 A1 | 9/1999 |
| EP | 1260640 A1 | 5/2002 |
| EP | 1 260 640 | 11/2002 |
| EP | 1 416 099 | 5/2004 |
| EP | 1 416 099 A2 | 5/2004 |
| EP | 1437305 | 7/2004 |
| FR | 2 502 458 | 10/1982 |
| FR | 2502458 | 10/1982 |

(Continued)

OTHER PUBLICATIONS

European Search Report, Oct. 5, 2005.

(Continued)

*Primary Examiner*—Tara Mayo-Pinnock
(74) *Attorney, Agent, or Firm*—Wolf, Greenfield & Sacks, P.C.

(57) ABSTRACT

A plastics infiltration block for infiltration or attenuation purposes is disclosed. The infiltration block has an essentially rectangular parallelepipedal body having pairs of opposed first, second and third faces. At least one inspection channel extends through the infiltration block and inspection channel openings are positioned in opposed third faces of the infiltration block. The area of each inspection channel opening is at least 10% of the size of the area of the third face. The infiltration block can include a single infiltration block element or multiple coupled infiltration block elements. The infiltration block element has an essentially rectangular parallelepipedal body. A grid of duct walls forming substantially parallel ducts extend between each first face and the one or more inspection channels of the infiltration block, and between each second face and the inspection channels of the infiltration block.

31 Claims, 11 Drawing Sheets

FOREIGN PATENT DOCUMENTS

| | | |
|---|---|---|
| JP | 11222885 | 8/1999 |
| WO | 98/20209 | 5/1998 |

OTHER PUBLICATIONS

EP Search report for Application No. EP 05075605, dated Oct. 5, 2005.

EP Search report for Application No. EP 04076793, dated Oct. 26, 2004.

EP Search report for Application No. EP 07075743, dated Oct. 4, 2004.

International Search Report for International Application No. PCT/EP2005/006118, dated Oct. 21, 2005.

INFILTRATION BLOCK

FIELD

The present invention relates to a plastics infiltration block, adapted for combining multiple infiltration blocks into an underground construction for infiltration or attenuation purposes. Such a construction is commonly placed underground to collect excess (rain) water and to enable water to be stored for subsequent infiltration into the surrounding soil (infiltration), or for temporary storage and subsequent slow release into the sewer system or other water discharge systems such as ponds or canals (attenuation) or re-use for domestic applications (non drinking water purposes). Other applications however, such as drainage of water-logged soil, may be foreseen as well.

RELATED ART

The underground construction is commonly sufficiently strong and stable to withstand soil and possibly traffic loads, e.g. when installed beneath a road or parking lot.

Inspection channels are commonly present in an infiltration block, said channels having such a size that equipment for inspection and/or cleaning may pass through, possibly also around a corner. The part of the underground construction surrounding the one or more inspection channels is sufficiently open to enable effective cleaning.

Various types of such infiltration blocks are known and applied in underground infiltration or attenuation constructions.

In EP 1260640 an infiltration block is described with an essentially rectangular parallelepipedal body constructed from one basic wall and various walls connected thereto. The walls are plate like and have a meshed structure, so that the infiltration block is water permeable. The walls define a volume in which water can be stored. The infiltration block comprises further an inspection channel, parallel to the basic wall and extending through the infiltration block, with inspection channel openings at both ends. The inspection channel openings cover approximately ⅓ of the face of the infiltration block in which the inspection channel opening is positioned.

Infiltration blocks of this type are easily clogged by dirt because of the rather closed structure of meshed walls. Cleaning would require the use of high pressure water jets, which is not desirable, as that would damage the water permeable (fabric) layer for infiltration or the impermeable layer for attenuation, which layer commonly surrounds the infiltration or attenuation construction.

SUMMARY

The present invention aims to provide an alternative infiltration block which can be combined easily with one or more other infiltration blocks into an underground construction with a desired strength and stability, while the mass of the infiltration block is preferably low.

The structure of the blocks is preferably more fully accessible in order that inspection and cleaning is possible everywhere in the construction. The assembly of the underground construction with the infiltration blocks of the current invention can be fast.

A first aspect relates to an infiltration block.

Inspection channel sections of one or more inspection channels are delimited by a single or multiple coupled infiltration block elements. Hence, one infiltration block is composed of one or more coupled infiltration block elements. At least one infiltration block element is of a one-part plastic construction having an essentially rectangular parallelepipedal body. On opposite sides of the part of the one or more inspection channels sections delimited by the infiltration block element the infiltration block element has side parts between which at least one intermediate part is situated. The infiltration block comprises adjacent ducts extending from the outsides of the infiltration block to the inspection channel. The ducts are preferably created by multiple elongated cores in the injection mould in which the one-part plastic infiltration block element is preferably moulded. This way, open ended ducts can be obtained with a size, large enough to prevent clogging by dirt and with sufficient water permeability. Preferably, the ducts are straight elongated ducts, e.g. of a rectangular cross-section. In a preferred embodiment, sets of parallel ducts are arranged at right angles to each of the first and second faces of the infiltration block.

Preferably, the infiltration blocks are easy to handle in transport and on the construction site. Low masses are preferable, as well as dimensions that enable brick wise stacking. Infiltration blocks with a dimension relation length—width—height of 2-1-1 are optimal. This makes it possible to stack the blocks cross-wise, horizontally and vertically to obtain a robust multi-layer construction.

Preferably, underground constructions may be combined with (known) inspection chambers or manholes with filtering and cleaning facilities to prevent dirt, silt etc. as much as possible from entering the constructions.

In order to obtain a high strength construction, the inspection channels have preferably a rounded or circular shape, although any other shape, such as a rectangular (preferably rounded at the corners) or oval shape, is also possible. Preferably, the cross section of the one or more inspection channels is uniform over the length of the infiltration block element. Otherwise, the cross section of the inspection channel in the inspection channel openings can differ from the cross section of the inspection channel within the infiltration block.

In a much preferred embodiment, two parallel inspection channels are provided in one infiltration block. This construction appears to give an optimal relation between strength and weight. In theory more parallel inspection channels are possible as well though. Between these parallel inspection channels one or more transverse channels may extend. Preferably, the cross section of each such transverse channel is at least 10% of the corresponding cross section of the block in which it is situated.

Preferably, the infiltration block elements are provided with one or more cut-out aids to assist in cutting out through-openings in intermediate body parts, said through-openings leading to inspection channels. Once cut out, such a through-opening can act as an inspection channel opening. These through-openings can be used for connecting inspection channels with horizontal and vertical axes.

In an advanced embodiment, a special element is placed either in an inspection channel opening and/or in a through-opening. Such a special element can for example be a filter element placed in a vertical inspection channel, which, preferably, is removable. Such a filter element can work as a blockage for sand and other particles. The filter element can be let down in the openings and when needed it can be pulled up for inspection and cleaning. A number of these filter elements could be installed after each other directly behind the inlet of the underground construction. Such a special element can also be a cover to close off an opening. These covers are preferably placed in the outer inspection channel openings of the underground construction. Another special element that can be placed in an inspection channel opening is a connection element for connecting an infiltration block to another infiltration block or to inlet or discharge pipes. Yet another special element is a conical shaped adapter that can be placed in an inspection channel to narrow the channel through which water can flow to the size of an adjacent through-opening. This is the case when the inspection channel opening of an infiltration block is placed on the through-opening of another infiltration block. Such an adapter can act as guidance for equipment (inspection/cleaning/measuring etc.) to enter the bottom inspection channel, it can act as reinforcement for the bottom part whereas a cut-out aid is removed and it can act as shear connection element between the bottom infiltration block and upper infiltration block. Furthermore such an adapter can prevent clogging of dirt in the corners of the infiltration block with the inspection channel.

Preferably, all inspection block elements are provided with one or more connecting means to mutually connect the infiltration block elements. Interconnected, the infiltration block elements can form an infiltration block, which infiltration blocks themselves can be mutually connected to form the underground construction. Preferably, underground constructions can be assembled quick and easy. Therefore, simple connecting means to connect the infiltration blocks are required. Also, an infiltration block is preferably made of as few infiltration block elements as possible. A combination of identical infiltration block elements to form an infiltration block is mostly preferred.

In a preferred embodiment, the infiltration block elements are provided with two or more parallel forklift channels for receiving the forks of a forklift. This enables forklift trucks to lift the units. This way, the assembly of an underground construction can be facilitated and possibly be faster. It is however also possible to provide the infiltration blocks with (detachable) feet to enable them to stand slightly off the ground to allow fork-lift forks underneath.

Preferably, the one-part infiltration block elements are integrally produced by injection moulding. An injection mould in which the infiltration block element is manufactured comprises multiple horizontal and vertical cores adjacent to or surrounding a core element that forms the inspection channel section. In this way, the ducts are created by the multiple elongated cores in the injection mould around which plastic is moulded. This way, ducts can be obtained with a size, large enough to prevent clogging by dirt and with sufficient water permeability. In a preferred embodiment, sets of parallel ducts are arranged at right angles to the first and second faces, respectively.

In one embodiment of an underground construction, the infiltration blocks are connected such that an inspection channel is obtained with a horizontal longitudinal axis. In another embodiment the infiltration blocks are connected such that an inspection channel is obtained with a vertical longitudinal axis. Otherwise, an embodiment of an underground construction is possible in which a combination of inspection channels with a vertical and with a horizontal longitudinal axis is present. For optimal access of the inspection channels such a combination of horizontal and vertical channels is desirable. To combine infiltration blocks with horizontal and vertical inspection channels specific connecting means are used. For this purpose it is also foreseen that the infiltration block elements are provided with one or more cut-out aids to assist in cutting out through-openings in intermediate body parts, said through-openings leading to inspection channels.

A plastics infiltration block adapted for combining multiple infiltration blocks into an underground construction (2) for infiltration or attenuation purposes is disclosed claim 21.

A method for producing a one-part plastics infiltration block element is also disclosed.

Furthermore, the present invention relates to special elements that can be placed either in an inspection channel opening and/or in a through-opening, created in a cut-out aid.

BRIEF DESCRIPTION OF DRAWINGS

The invention will now be explained in detail with reference to preferred embodiments. In the drawings.

DETAILED DESCRIPTION

Figure 1:
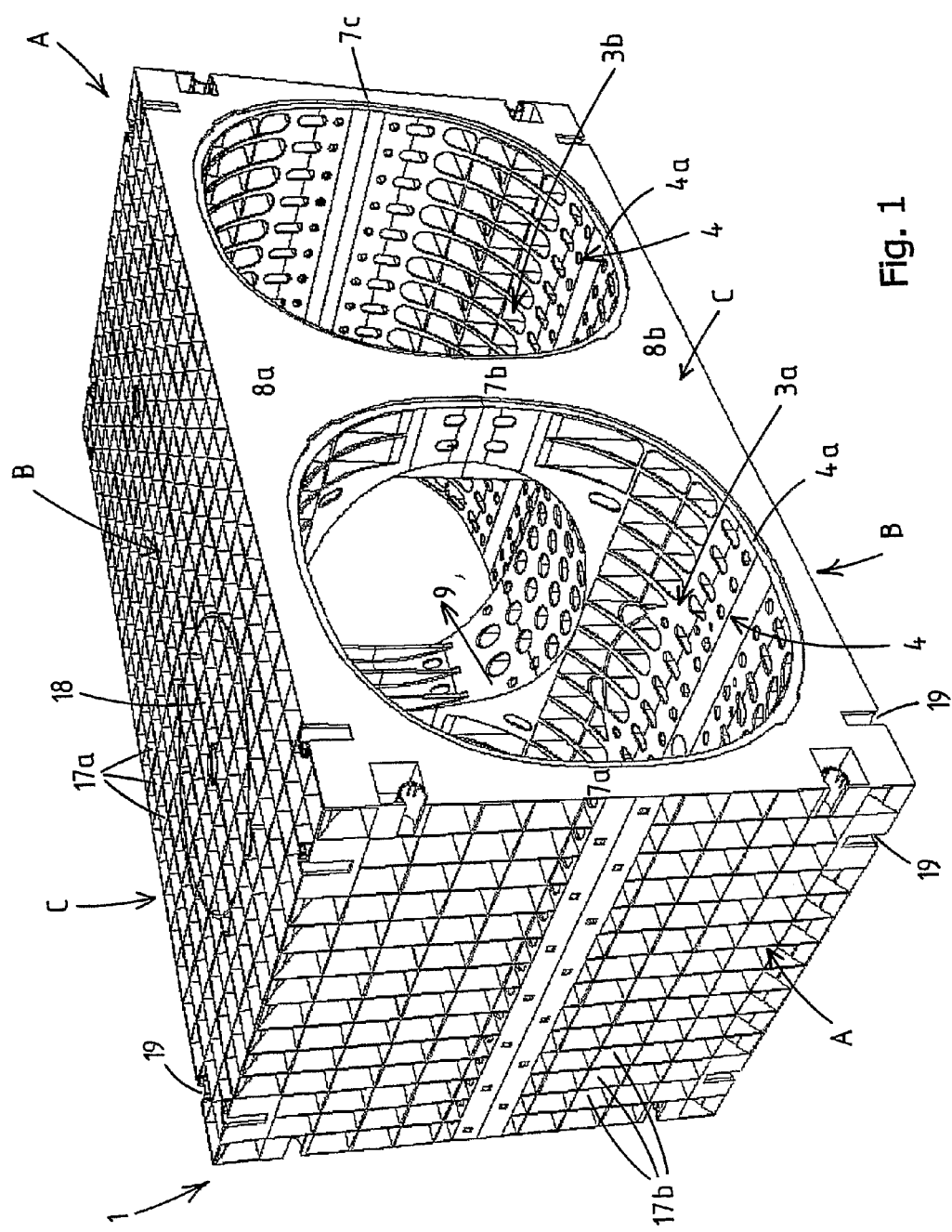
FIG. 1 is a perspective view of an infiltration block according to the invention.

In FIG. 1, a first preferred embodiment of an infiltration block 1 according to an aspect of the invention is shown. The infiltration block 1 has an essentially rectangular parallelepipedal body and has a pair of opposed first faces A, a pair of opposed second faces B, and a pair of opposed third faces C.

Two parallel inspection channels 3a and 3b extend through the infiltration block 1 between the third faces C and parallel to the first faces A. The inspection channels 3a, 3b have inspection channel openings 4 positioned in the opposed faces C of the infiltration block 1.

The cross-section of both inspection channels 3a and 3b here is of a preferred circular shape, and is—as is preferred—uniform over the length of the inspection channels.

The area of each inspection channel opening 4 is over 10% of the size of the area of the face 5 of the infiltration block 1 in which it is positioned. The area of each inspection channel is large enough to make it possible for equipment for inspection and/or cleaning to pass through, possibly around a corner. The total area covered by the two inspection channel openings 4 in the face C is over 50% of the face C.

Between the parallel inspection channels 3a and 3b one transverse channel 9 extends in this embodiment. The transverse channel 9 here has a circular cross-section, which covers over 10% of the corresponding cross section of the infiltration block 1 in which it is situated.

The block 1 in FIG. 1 could be a single monolithic block, as a one-part plastic construction formed in a suitable mould. This is in particular effective if said transverse channel 9 would be absent, which is also within the scope of the present invention.

The body of the block 1 is essentially formed by side body parts 7a, 7b, and 7c on opposite sides of the two inspection channels 3a and 3b and—between the side body parts 7a, 7b and 7c-two intermediate body parts 8a and 8b. As can be seen the outer side body parts 7a, 7c delimit the faces A of the block, whereas the intermediate body parts delimit the faces B of the block.

The side body parts and one or more intermediate body parts of said one-part plastic construction infiltration block 1 are essentially formed by a grid of duct walls, which duct walls form essentially parallel ducts 17b extending between each first face A and the one or more inspection channels of the infiltration block element, and essentially parallel ducts 17a extending between each second face B and the one or more inspection channels of the infiltration block 1.

In the embodiment shown all ducts 17a, b are open ended at the outer face of the block, and the majority of the ducts 17a, b is also open ended at the other end and thus in communication with an inspection channel.

As can be seen in FIG. 1 some ducts have an end wall at the end near the inspection channel, most of these end walls being provided with a hole for the passage of water. In the FIG. 1 circular and slotted holes can be recognised.

The ducts 17a, b are arranged here at right angles to the face from which they extend, so that two sets of mutually right angled ducts are obtained.

In this embodiment the ducts 17a, b essentially have a rectangular cross-section, which here is essentially uniform over the length of the ducts.

The ducts 17a, b shown in this embodiment are created by multiple elongated cores in the injection mould around which plastic is moulded. This way, ducts 17a, 17b are obtained with a size, large enough to prevent clogging by dirt and with sufficient water permeability. The infiltration block has a very open structure and that will prevent clogging by dirt as much as possible, furthermore almost all area's of the infiltration block are accessible and cleanable via the large inspection channels 3a and 3b.

In the shown embodiment, recessed areas 4a are present in the faces 5a and 5b (not shown) of the infiltration block 1 around each of the inspection channel openings 4. The function of these recessed areas 4a will be explained in relation to FIGS. 7-10.

A cut-out aid 18 is present in intermediate body parts 8a of the shown infiltration block 1. The cut-out aid 18 is introduced to assist in cutting out through-openings in intermediate body parts during installation or prefab made in factory, said through-openings leading to inspection channels. These through-openings can be used for connecting the channels with horizontal and vertical axes. Once cut out, such a through-opening can act as an inspection channel opening which can, if desired, be closed off with a cover. Such a through-opening can also be used to place connection elements in, for connecting an infiltration block to another infiltration block or to inlet or discharge pipes. Another purpose of such a through-opening can be to accommodate filter elements. Such a filter element can work as a blockage for sand and other particles. The filter element can be let down in the openings and when needed it can be pulled up for inspection and cleaning.

The infiltration block 1 shown in FIG. 1 further comprises recesses 19 for receiving coupling elements that can couple multiple infiltration blocks together to form an underground infiltration construction.

Figure 2:
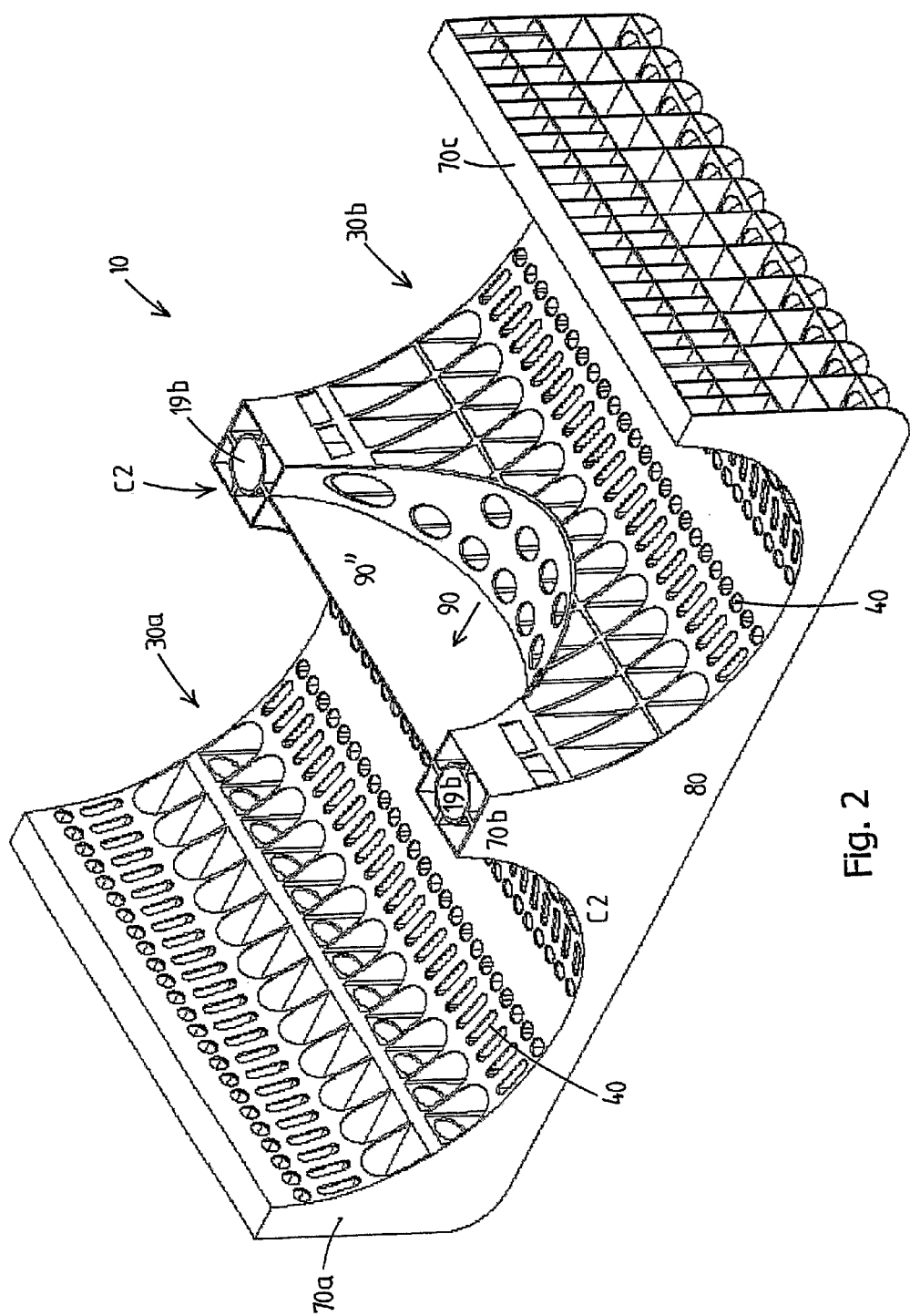
FIG. 2 shows an infiltration block element according to the invention.
Figure 3:
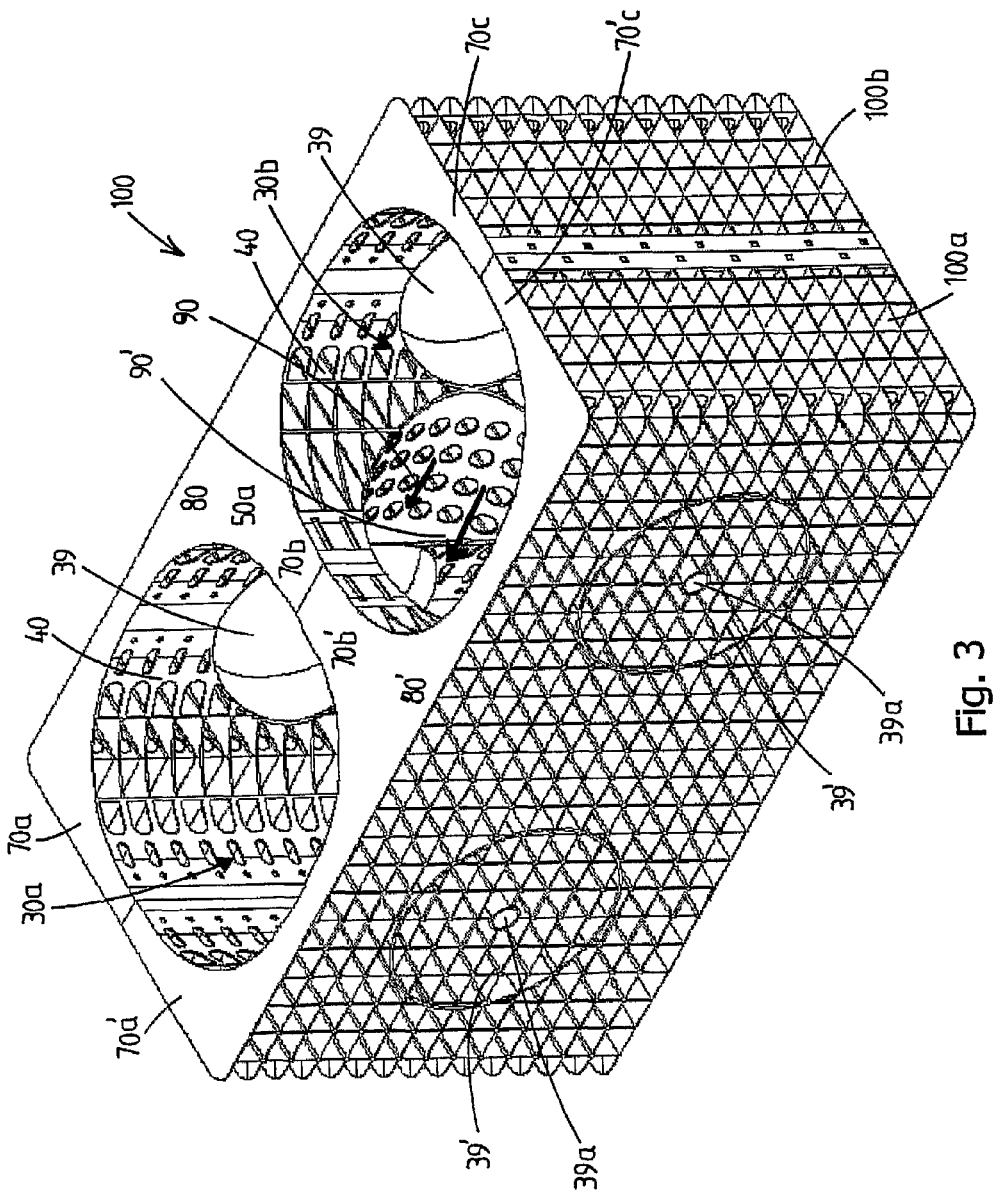
FIG. 3 shows an infiltration block according to the invention composed of infiltration block elements as shown in FIG. 2.

An infiltration block designed similar to that of FIG. 1 can also be composed of two—preferably identical—infiltration block elements, such as element 10 as shown in FIG. 2. Such an infiltration block 100 consisting of two infiltration block elements 10 is shown in FIG. 3. Upon assembly, circular inspection channels 30a and 30b are created from pairs of semi-circular inspection channel sections. The inspection channels 30a and 30b comprise inspection channel openings 40 positioned in opposite faces C2. Preferably, these infiltration block elements can mutually be connected by connecting means (not shown), e.g. in recesses 19b to form an infiltration block, such as infiltration block 100 as shown in FIG. 3. The area of each inspection channel opening is over 10% of the size of the area of the face 50 in which it is positioned. The total area covered by the two inspection channel openings 40 is at least half of the size of the area of the face of the infiltration block 50 in which these two inspection channel openings 40 are positioned. The formed inspection channels are hence delimited by two infiltration block elements.

The infiltration block element 10 shown in FIG. 2 is of a one-part plastic construction and has an essentially rectangular parallelepipedal body. The body is constructed of three side body parts 70a, 70b and 70c on opposite sides of the two semi-circular inspection channel sections of the inspection channels 30a and 30b.

In the infiltration block 100 in FIG. 3 two bodies of infiltration block elements 100a and 100b can be discerned, and hence two sets of side body parts 70a, 70b, 70c in infiltration block element 100b and 70a', 70b', 70c' in infiltration block element 10a. The inspection channel sections have a uniform cross section over the length of the infiltration block element. Between the side body parts 70a, 70b and 70c one intermediate body part 80 is present. In FIG. 3 is shown that between the side body parts 70a', 70b' and 70c' one intermediate body part 80' is present. Within the side body parts 70b and 70b' transverse channel sections 90 and 90' extend. The cross section of a single transverse channel is over 10% of the corresponding cross section of the infiltration block element 10. In the infiltration block element 10 in FIG. 2 a wall 90" is present in the transverse channel 90. In FIG. 3 cut-out aids 39' are present in intermediate body part 80' of the shown infiltration block 100. Cut-out aids 39' comprise openings 39a in which for example connection elements such as element 81 shown in FIG. 11 can be placed. Through-openings 39 are present in the opposite intermediate body part 80.

Figure 4:
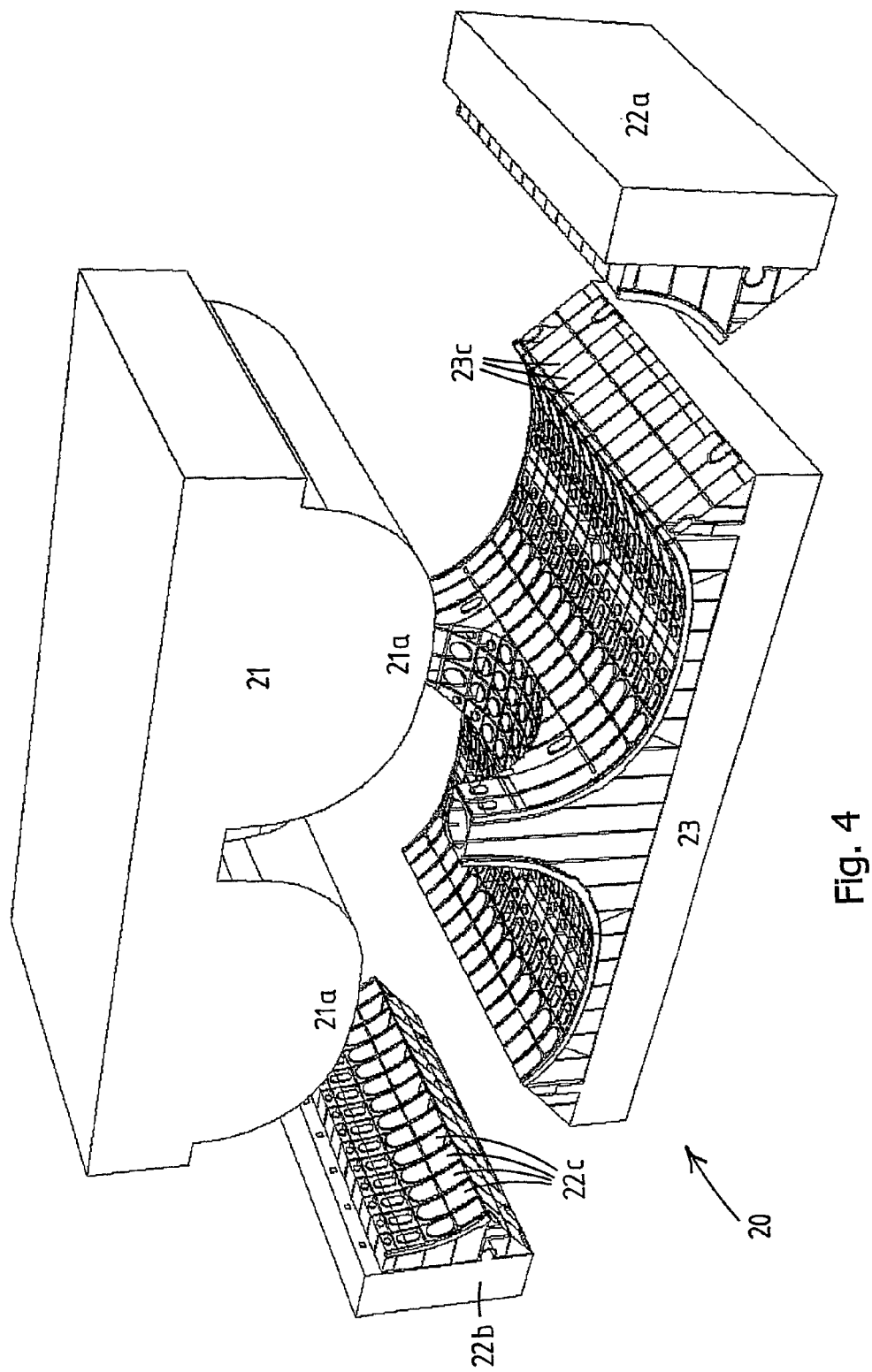
FIG. 4 shows an injection mould that can be used for manufacturing an infiltration block element as shown in FIG. 2.

The infiltration block elements according to the invention are preferably integrally produced by injection moulding. FIG. 4 shows an injection mould that can be used for manufacturing an infiltration block element as shown in FIG. 2. The shown mould 20 comprises four main mould elements 21, 22a and 22b and 23. The mould element 21 comprises two cores 21a—here semi-circular—defining the inspection channel sections. Movable at right angles to the mould element 21 are opposed mould elements 22a and 22b, which each comprise multiple, in the shown orientation, horizontal parallel cores 22c, in a two dimensional array. Opposite to the mould element 21 is mould element 23 which also comprising multiple, parallel and in the shown orientation, vertical cores 23c. The horizontal and vertical cores define between the grid of duct walls, which form the parallel ducts extending from the outside of the infiltration block to the inspection channels. When the mould elements 21, 22a, 22b, 23 are brought in their moulding position, plastic is injected to form the infiltration block element.

Figure 5:
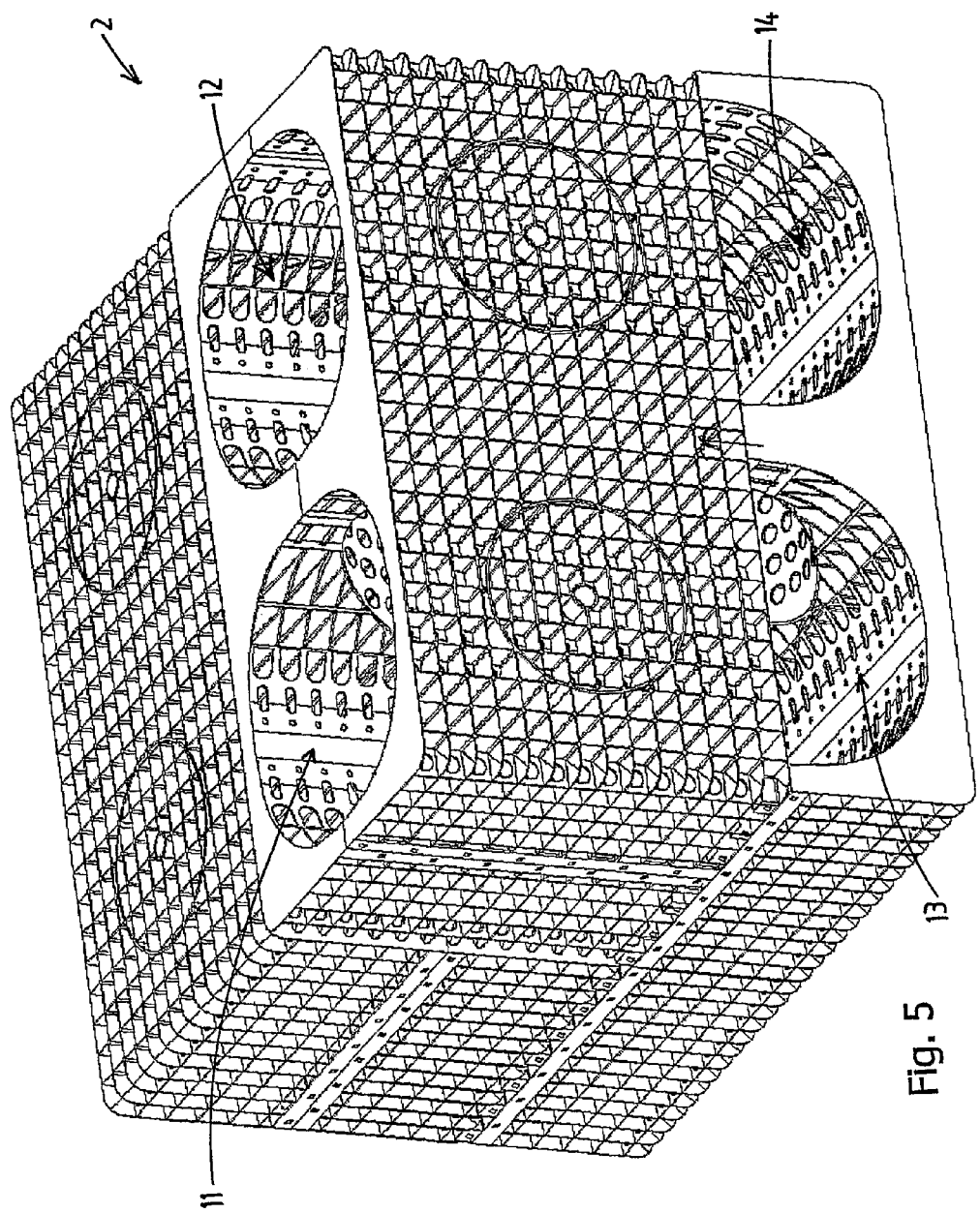
FIG. 5 shows a first underground construction composed of infiltration block elements according to the invention.

The infiltration blocks according to FIG. 1 and FIG. 3 can be assembled and coupled to form an underground construction such as the construction 2 shown in FIG. 5. The underground construction shown in FIG. 5 is composed of six infiltration block elements 10 such as shown in FIG. 2. Four infiltration block elements 10 are assembled to form two infiltration blocks such as the one shown in FIG. 3. The underground construction comprises two inspection channels 11 and 12 with a vertical longitudinal axis and with a circular cross section, two inspection channels (not shown) with a horizontal longitudinal axis and with a circular cross section, and two inspection channels 13 and 14 with a horizontal longitudinal axis and a semi-circular cross section. Furthermore, the construction comprises transverse channels.

Figure 6:
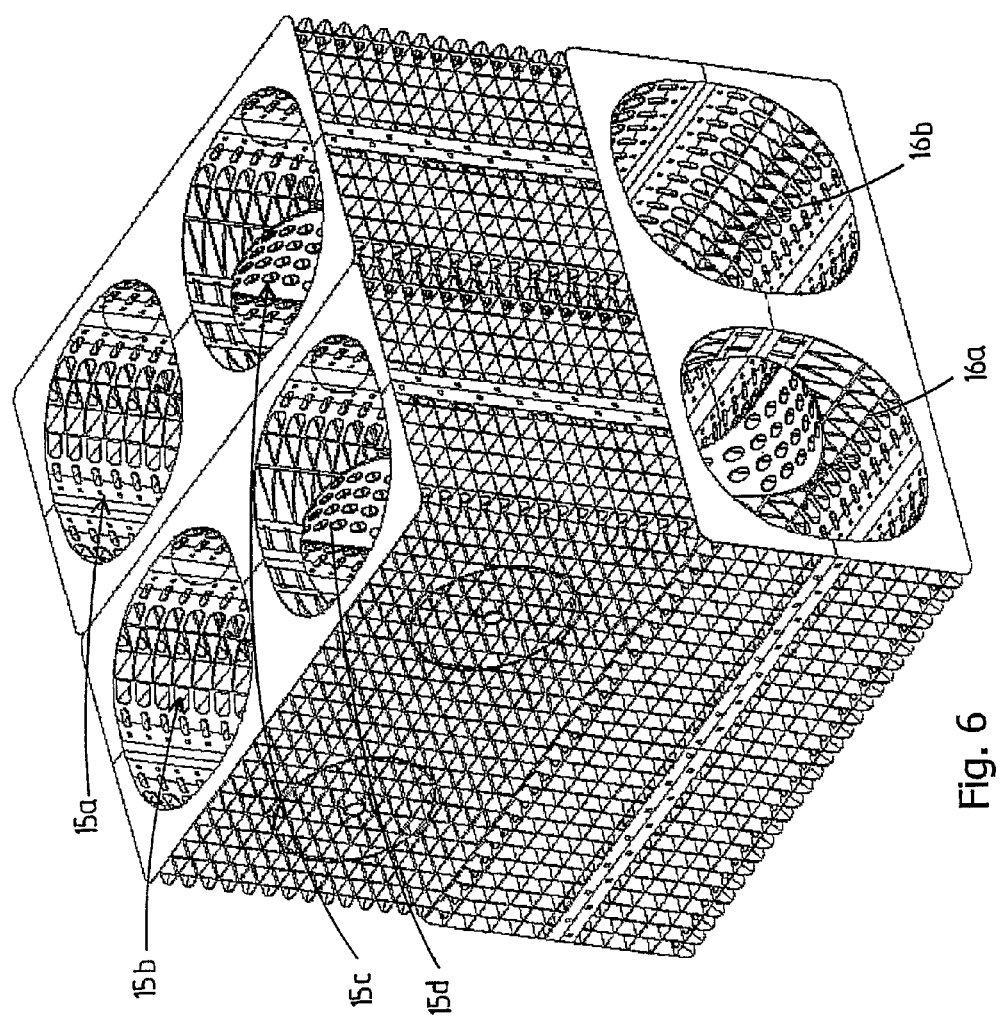
FIG. 6 shows a second underground construction composed of infiltration block elements according to the invention.

FIG. 6 shows another embodiment of underground construction according to the invention composed of four infiltration blocks such as shown in FIGS. 1 and 3. This underground construction is assembled from eight infiltration block elements according to FIG. 2. The underground construction of FIG. 6 comprises four inspection channels 15a-d with a vertical longitudinal axis and a circular cross section and two inspection channels 16a and 16b with a horizontal longitudinal axis and a circular cross section.

Figure 7:
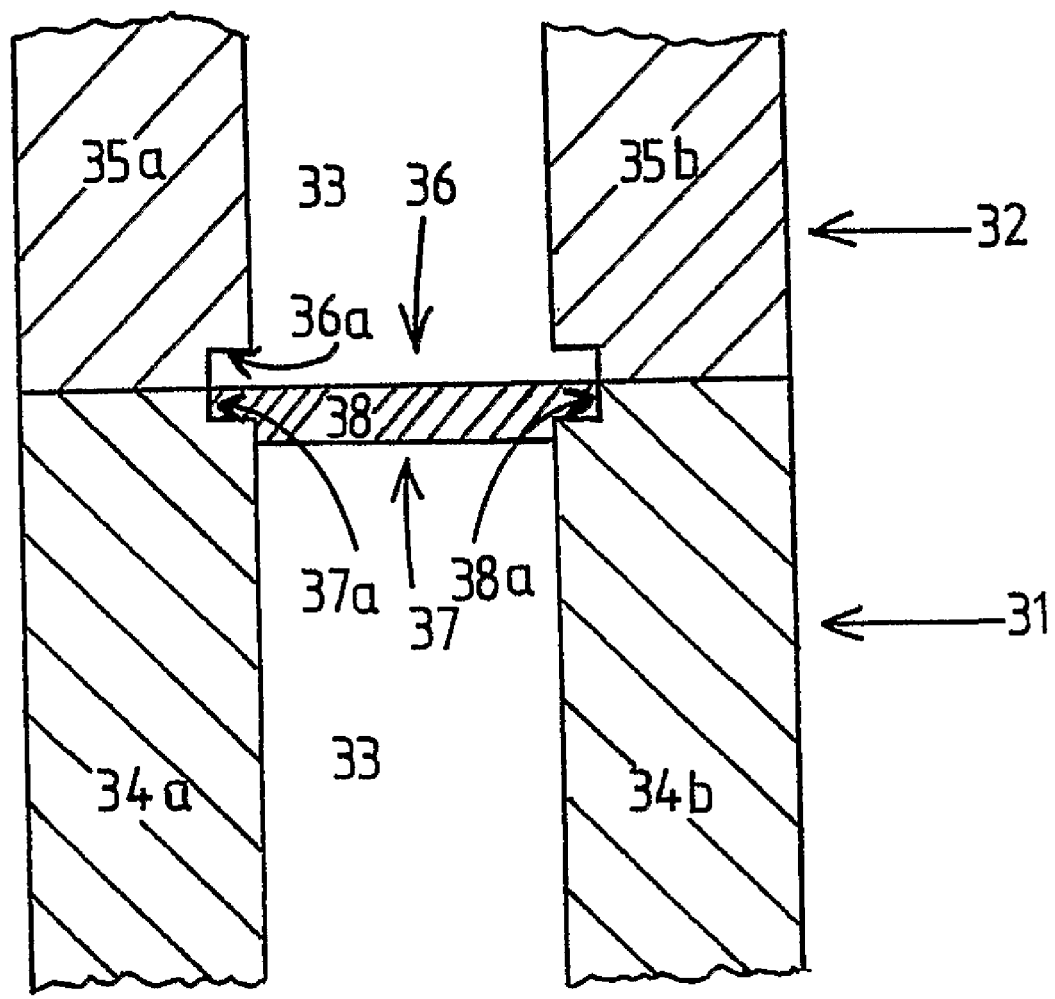
FIG. 7 shows schematically a cross section of part of two assembled infiltration blocks.

FIG. 7 shows schematically a cross section of part of two assembled infiltration blocks 31 and 32. Side body parts 34a and 34b of infiltration block 31, and side body parts 35a and 35b of infiltration block 32 surround an inspection channel 33. Around inspection channel opening 36 of infiltration block 32 and inspection channel opening 37 of infiltration block 31 recesses 36a and 37a respectively are present in the faces of the infiltration blocks (not shown), similar to the recesses 4a shown in FIG. 1. In the inspection channel opening 37 a reinforcement part 38 is applied. This reinforcement part 38 cannot be pushed out of the inspection channel opening 37 into the inspection channel 33, since the collar 38a of the reinforcement part 38 fits in the recesses 37a and 36a, but is too large to fit in the inspection channel 33.

Figure 8:
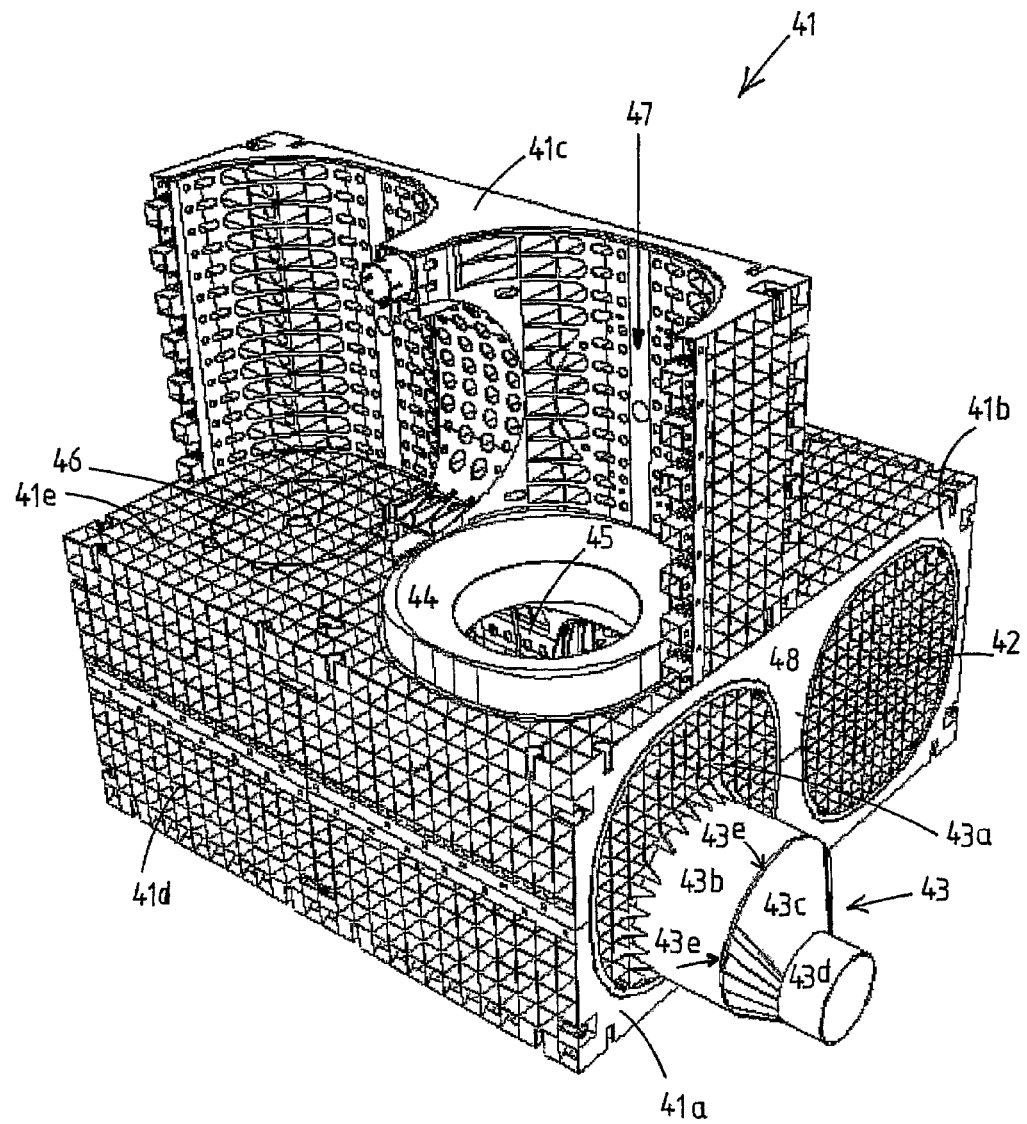
FIGS. 8, 9 and 10 show various examples of special elements placed in inspection channel openings.
Figure 9:
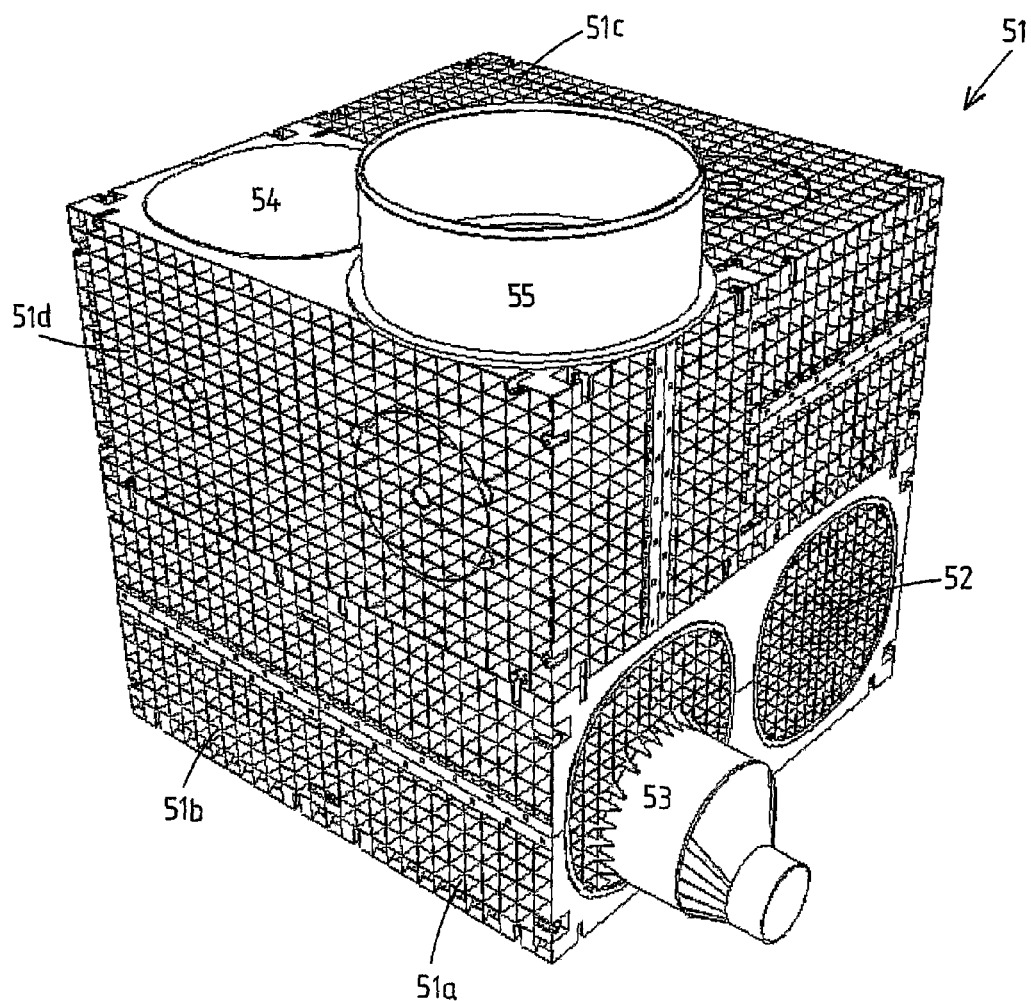
Figure 10:
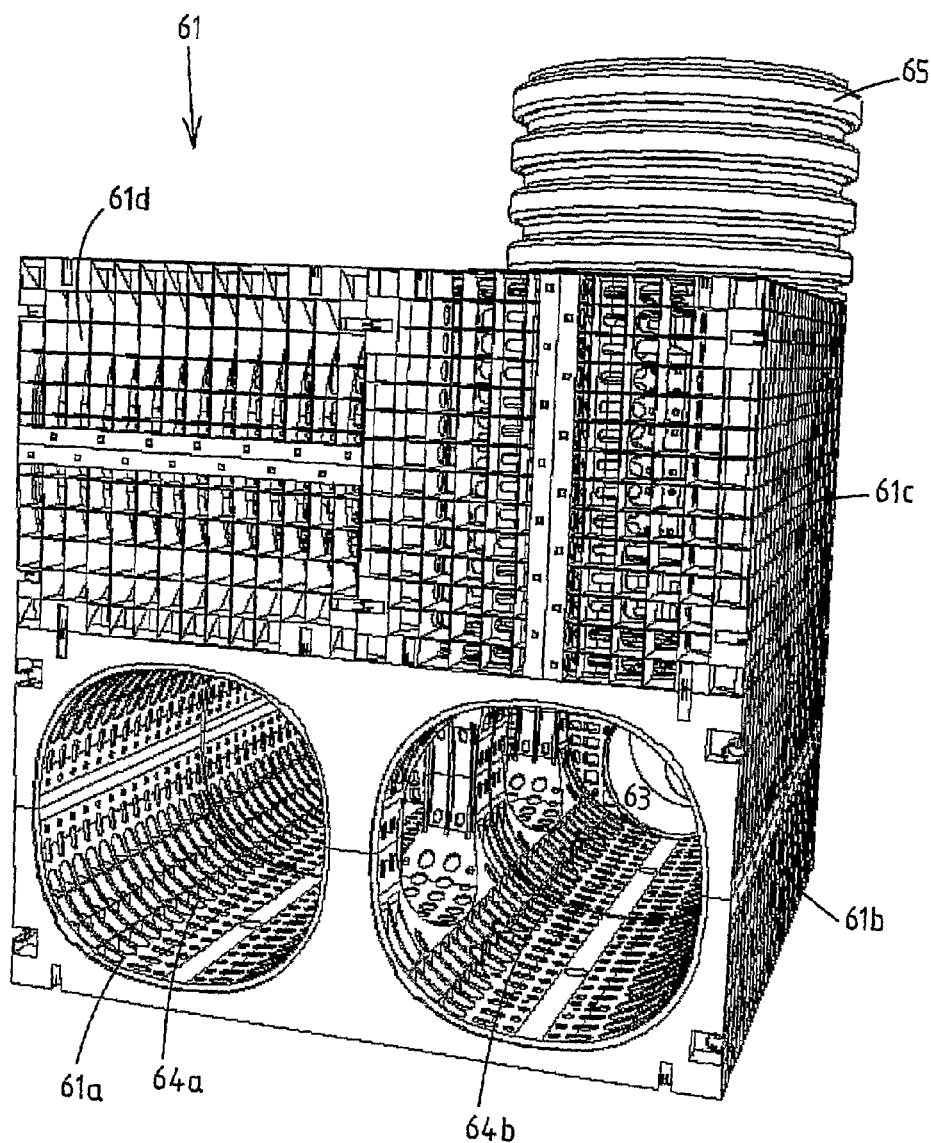

FIGS. 8, 9 and 10 show various examples of special elements that are placed in inspection channel openings and that comprise collars that fit into the recesses in the inspection channel openings, such as the recesses 4a shown in FIG. 1 and the recesses 36a and 37a shown in FIG. 6.

FIG. 8 shows an underground construction 41 constructed of five coupled infiltration block elements 41a, 41b, 41c, 41d and 41e. In face 48 of the infiltration block composed of coupled elements 41a and 41b two special elements 42 and 43 are placed in the inspection channel openings. Special element 42 is a reinforcement part, comparable to the part 38 shown in FIG. 7. The shown reinforcement part 42 is of a meshed construction to allow water to move through the reinforcement part 42. Special element 43 is a connection part and comprises a meshed part 43a, a hollow cylindrical part 43b with a relatively large diameter, a conical part 43c and a cylindrical part with a relatively small diameter 43d. The cylindrical/conical part 43b, 43c, 43d can be used for connecting the infiltration block to charge or discharge piping (not shown) and/or to an inspection chamber or manhole. In this case a small diameter pipe can be connected to the cylindrical part 43d, or a big diameter pipe can be connected to the cylindrical part 43b. Therefore a small recess area 43e is made on the cylindrical part 43b that could be used as cutting guidance in case a big diameter pipe connection should be made.

Special element 44 is placed on top of the infiltration block composed of coupled elements 41a and 41b on a through-opening 45 created by a cut-out aid similar to the cut-out aid 46. Special element 44 is a ring shaped conical adapter placed in the inspection channel 47 partly defined by the shown infiltration block element 41c. The conical shaped adapter 44 narrows the diameter of the inspection channel 47 through which water can flow to the size of the diameter of the adjacent through-opening 45. The conical adapter can be provided with a conical shaped top surface for guidance of equipment (for example inspection/cleaning/measuring equipment) to enter the bottom inspection channel via the entrance opening. Furthermore the conical adapter can be used as reinforcement element for the bottom infiltration block whereas the through opening was created by taking out the cut-out aid. Furthermore the conical adapter can act as a shear connection element between the upper and lower infiltration block that allows building a robust system. The conical shaped adapter 44 can prevent clogging of dirt in the corners of the infiltration block element 41c partly defining the inspection channel 47.

FIG. 9 shows an underground construction 51 constructed of eight coupled infiltration block elements forming four infiltration blocks 51a, 51b, 51c and 51d. In face 58 of the infiltration block 51a two special elements 52 and 53 are placed in the inspection channel openings, similar to the reinforcement part 42 and the connection part 43 shown in FIG. 8. On top of infiltration block 51b two special elements 54 and 55 are arranged. Special element 54 is a cover, closing off the not shown inspection channel arranged under the cover 54. The cover 54 could be made not water permeable. Special element 55 is a connection element to connect the underground construction 51 for example to a corrugated connection element or other type of shaft pipe (see FIG. 10) that could be connected to a standard cover solution (not shown), or special element 55 could be used for example for connection to big diameter charge or discharge piping. Of course special element 55 could also be placed in the horizontal direction for this purpose.

FIG. 10 shows an underground construction 61 constructed of eight coupled infiltration block elements forming four infiltration blocks 61a, 61b, 61c and 61d. In a not shown face of the infiltration block 61b a special element 63 is placed in the inspection channel opening of the inspection channel 64b similar to the connection part 43 shown in FIG. 8. On top of infiltration block 61c a special element 65 is arranged. Special element 65 is a corrugated connection element that is connected via the special element 55 in FIG. 9 to the infiltration block. The corrugated connection element could also be another type of shaft pipe and is used to connect the underground construction 61 for example to a standard cover solution (not shown) that is normally also used for covering inspection chambers and manholes. The cover solution could provide accessibility to the underground infiltration system (61) for example for inspection, cleaning or other kind of maintenance activities.

Figure 11:
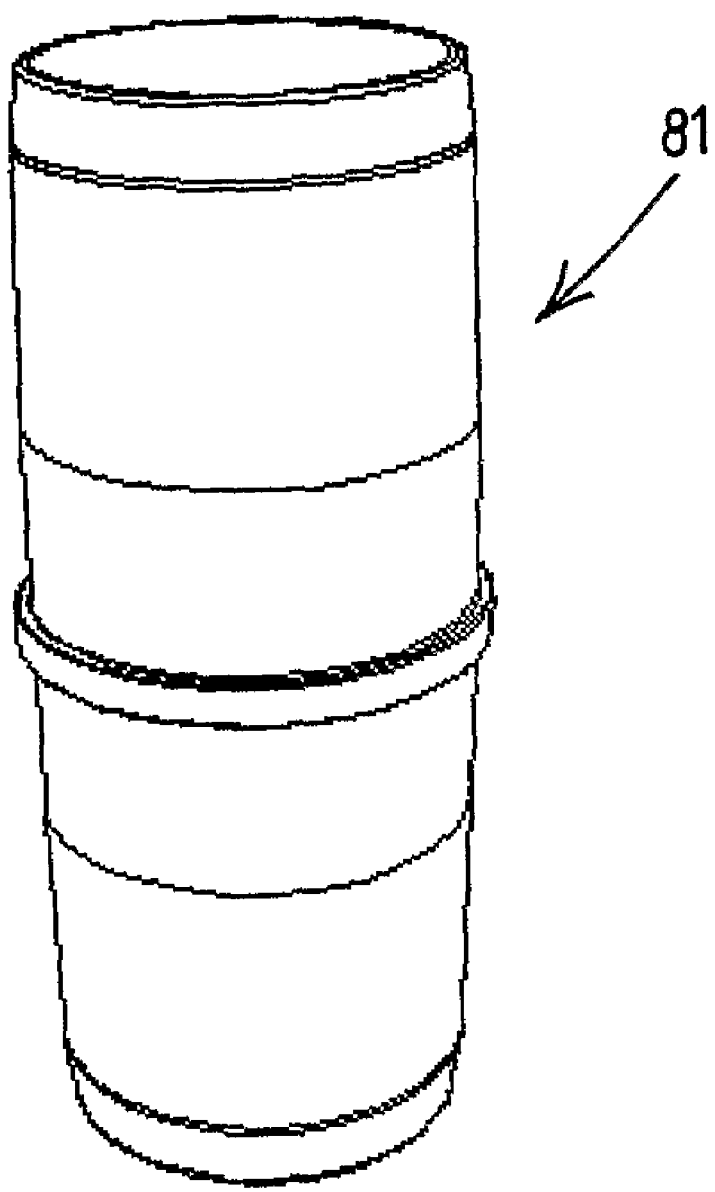
FIG. 11 shows an alternative special element that can be placed in a through-opening.

FIG. 11 shows an alternative special element 81 that can be placed in an opening such as opening 39a in FIG. 3. Similar shaped, but larger special elements can be placed in a through-opening such as can be created by removing cut-out aid 18 in FIG. 1, or in a through-opening 39 such as shown in FIG. 3. The special element 81 can be used for the assembly of infiltration blocks to form an underground construction. Such a connection element 81 enables a solid construction of infiltration blocks, not being sensitive to shear.

The invention claimed is:

1. A plastics infiltration block adapted for combining multiple infiltration blocks into an underground construction for infiltration or attenuation purposes,
    which infiltration block has an essentially rectangular parallelepipedal body having pairs of opposed first, second and third faces,
    through which infiltration block at least one inspection channel extends, with inspection channel openings positioned in opposed third faces of the infiltration block, whereby the area of each inspection channel opening is at least 10% of the size of the area of the third face in which it is positioned,
    which infiltration block comprises a single infiltration block element or multiple couple infiltration block elements, wherein one or more inspection channel sections of the one or more inspection channels are delimited by a single or multiple coupled infiltration block elements, wherein at least one infiltration block element is of a one-part plastic construction having an essentially rectangular parallelepipedal body with side body parts essentially on opposite sides of the one or more inspection channel sections, and with at least one intermediate body part situated between the side body parts, wherein the first faces of the infiltration block are formed by side body parts and second faces of the infiltration block are formed by intermediate body parts, wherein the side body parts and one or more intermediate body parts of said one-part plastic construction infiltration block element are essentially formed by a grid of duct walls, which duct walls form essentially parallel ducts extending between each first face and the one or more inspection channels of the infiltration block element, and between each second face and the one or more inspection channels of the infiltration block element, and wherein the total area covered by the one or more inspection channel openings is at least half of the size of the area of the third face of the infiltration block in which this one or more inspection channel openings are positioned.

2. The infiltration block according to claim 1, in which the cross-section of the one or more inspection channels is of an essentially rectangular shape.

3. The infiltration block according to claim 1, in which the cross-section of the one or more inspection channels is of an essentially rounded or circular shape.

4. The infiltration block according to claim 1, in which the cross section of the one or more inspection channels is uniform over the length of the infiltration block element.

5. The infiltration block according to claim 1, in which two or more parallel inspection channels are present.

6. The infiltration block according to claim 5, in which between the parallel inspection channels one or more transverse channels extend.

7. The infiltration block according to claim 6, whereby the cross section of each transverse channel is at least 10% of the corresponding cross section of the block in which it is situated.

8. The infiltration block according to claim 1, in which the one or more infiltration block elements are provided with one or more cut-out aids to assist in cutting out through-openings in intermediate body parts, said through-openings leading to inspection channels.

9. The infiltration block according to claim 8, in which in the through-opening a removable filter is placed.

10. The infiltration block according to claim 1, in which in the inspection channel openings conical adapter elements are placed.

11. The infiltration block according to claim 1, in which in the inspection channel openings closures are placed.

12. The infiltration block according to claim 1, in which in the inspection channel openings reinforcement elements are placed.

13. The infiltration block according to claim 1, in which the one or more infiltration block elements are provided with one or more connecting means to mutually connect the infiltration block elements.

14. The infiltration block according to claim 1, in which the one or more infiltration block elements are provided with two or more parallel forklift channels for receiving the forks of a forklift.

15. The infiltration block according to claim 1, in which the one or more infiltration block elements are integrally produced by injection molding.

16. The infiltration block according to claim 15, in which the infiltration block elements are manufactured in an injection mold comprising multiple horizontal and vertical cores adjacent to or surrounding one or more core elements that forms the inspection channel section.

17. An underground construction formed by one or more mutually connected infiltration blocks according to claim 1.

18. The underground construction according to claim 17, in which the infiltration blocks are connected such that an inspection channel system is obtained with a horizontal longitudinal axis.

19. The underground construction according to claim 17, in which the infiltration blocks are connected such that an inspection channel is obtained with a vertical longitudinal axis.

20. The underground construction according to claim 17, in which the infiltration blocks are connected such that an inspection channel system is obtained with a combination of inspection channels with a vertical and with a horizontal longitudinal axis.

21. The underground construction according to claims 17, which is placed in water permeable material to enable water to be stored for infiltration into the surrounding soil.

22. A method for producing a one-part plastics infiltration block element according to claim 1, in which a mold is used comprising:
    providing one or more cores defining at least one inspection channel section of the infiltration block element,
    providing multiple cores, and
    forming, with said multiple cores, said ducts essentially parallel and extending between each first face and the one or more inspection channels of the infiltration block element, and between each second face and the one or more inspection channels of the infiltration block element.

23. A plastics infiltration block adapted for combining multiple infiltration blocks into an underground construction for infiltration or attenuation purposes, said infiltration block comprising an essentially rectangular parallelepipedal body with pairs of opposed first, second and third faces,
    wherein one or more inspection channel sections extend between said third faces with inspection channel openings positioned in said third faces whereby the area of each inspection channel opening is at least 10% of the size of the area of the third face in which it is positioned, and wherein said infiltration block is composed of one or more one-part plastic infiltration block elements,
    and wherein each one-part plastic infiltration block element is essentially formed by a grid of duct walls, which duct walls form essentially parallel ducts extending between each first face and the one or more inspection channels of the infiltration block and between each second face and the one or more inspection channels of the infiltration block.

24. The infiltration block according to claim 23, wherein the total area covered by the one or more inspection channel openings is at least half of the size of the area of the third face of the infiltration block in which this one or more inspection channel openings is positioned.

25. The infiltration block according to claim 23, wherein the cross-section of the one or more inspection channels is of an essentially rounded or circular shape.

26. The infiltration block according to claim 23, wherein the cross-section of the one or more inspection channels is of an essentially rectangular shape.

27. The infiltration block according to claim 23, wherein the one or more infiltration block elements each is provided with one or more connectors to mutually connect the infiltration block elements.

28. The infiltration block according to claim 23, wherein the one or more infiltration block elements each is an injection molded monolithic component.

29. The infiltration block according to claim 23, wherein the one or more infiltration block elements each is provided with one or more cut-out aids to assist in cutting out through-openings in intermediate body parts, said through-openings leading to inspection channels.

30. The infiltration block according to claim 29, wherein, in the through-opening, a removable filter element is placed.

31. The infiltration block according to claim 23, wherein, in the inspection channel openings, at least one special element comprising at least one of a conical adapter element, a closure, a reinforcement element, and a connection element is placed, wherein the at least one special element is removable.

* * * * *